United States Patent
Tagawa

[19]

[11] Patent Number: 6,046,987
[45] Date of Patent: Apr. 4, 2000

[54] INSTRUMENT FOR MEASURING LEAKAGE POWER LEAKING TO ADJACENT CHANNEL

[75] Inventor: Chihiro Tagawa, Isehara, Japan

[73] Assignee: Anritsu Corporation, Tokyo, Japan

[21] Appl. No.: 09/029,435

[22] PCT Filed: Jun. 3, 1997

[86] PCT No.: PCT/JP97/01878

§ 371 Date: Mar. 4, 1998

§ 102(e) Date: Mar. 4, 1998

[87] PCT Pub. No.: WO98/01965

PCT Pub. Date: Jan. 15, 1998

[30] Foreign Application Priority Data

Jul. 5, 1996 [JP] Japan ................................. 8-176394

[51] Int. Cl.[7] .................................................. H04B 7/26
[52] U.S. Cl. .................. 370/252; 455/67.1; 455/226.1
[58] Field of Search .................... 370/241, 252, 370/253, 503, 513, 514, 509, 515, 512; 375/224, 316, 355, 360, 365, 366, 367, 368; 455/67.1, 67.3, 67.6, 226.1, 226.2; 324/76.11, 76.12, 76.19, 76.21

[56] References Cited

U.S. PATENT DOCUMENTS

| 4,408,322 | 10/1983 | Chadwick et al. | 370/252 |
| 4,810,960 | 3/1989 | Owen et al. | 324/79 |
| 5,303,262 | 4/1994 | Johnson | 375/224 |
| 5,475,709 | 12/1995 | Futagami et al. | |
| 5,808,463 | 9/1998 | Nagano | 324/76.21 |

FOREIGN PATENT DOCUMENTS

| 6-326672 | 11/1994 | Japan. |
| 8-15353 | 1/1996 | Japan. |
| 8-254558 | 10/1996 | Japan. |

*Primary Examiner*—Chi H. Pham
*Assistant Examiner*—Ricky Q. Ngo
*Attorney, Agent, or Firm*—Frishauf, Holtz, Goodman, Langer & Chick, P.C.

[57] ABSTRACT

In order to measure the leakage power of a communications signal using a burst signal, with respect to adjacent channels, an input signal containing a modulated signal is subjected to A/D conversion in an A/D converter 23 and then written into a waveform memory 25. The input signal read from the waveform memory is demodulated to digital data by means of a demodulating section 29. An extraction region calculating section 33 detects the position of a synchronizing word in the digital data demodulated, and determines the extraction region AR of the input signal stored in the waveform memory 25. One filter 35a or a plurality of filters 35 allow passage of the signal components in the frequency bands of the channels adjacent to the main channel. Switching sections 34 and 28 supply the signals in the extraction region determined, which are included in the input signal stored in the waveform memory 25. One power measuring section 35a or a plurality of power measuring sections 35 measure the power of each signal component which has passed through one filter.

13 Claims, 16 Drawing Sheets

MT8801B   96/10/18:05:42          ☑ Measure : Single
<< Output RF Spectrum [GSM] >>       Storage : Normal
                                     Call Proc : Communication
                                     Method : Hight Speed

| offset Freq. | Modulation Lower | Modulation Upper | Switching Transients Lower | Switching Transients Upper |
|---|---|---|---|---|
| 0 kHz | 16.97dBm | 15.39dBm | 22.44dBm | 23.58dBm |
| 100 kHz | -5.56dB | -6.40dB | 17.34dBm | 17.08dBm |
| 200 kHz | -30.13dB | -34.16dB | -5.74dBm | -7.91dBm |
| 250 kHz | -39.27dB | -38.87dB | -13.83dBm | -17.38dBm |
| 400 kHz | -63.89dB | -61.98dB | -38.42dBm | -36.68dBm |
| 600 kHz | -66.64dB | -67.37dB | -41.63dBm | -40.29dBm |
| 800 kHz | -71.78dB | -67.43dB | -43.56dBm | -42.15dBm |
| 1000 kHz | -68.34dB | -69.54dB | -45.31dBm | -46.08dBm |
| 1200 kHz | -71.44dB | -71.17dB | -46.85dBm | -45.39dBm |
| 1400 kHz | -74.14dB | -71.93dB | -48.95dBm | -44.63dBm |
| 1600 kHz | -73.25dB | -73.71dB | -49.50dBm | -50.19dBm |
| 1800 kHz | -73.34dB | -74.85dB | -48.73dBm | -49.93dBm |
| 2000 kHz | -73.55dB | -73.16dB | -48.86dBm | -51.10dBm |

GSM   Level : 20dBm

Channel :  #           1CH Frequency : 890.200000 MHz

| Channel | TX Reference Level # | MS Power Level # | Timing Advance # |
|---|---|---|---|

RF Spectrum

Storage Mode *
Calibration *
Adjust Range
Back Screen ↑
1
1 2
Mane Func On | off

FIG. 4H

INSTRUMENT FOR MEASURING LEAKAGE POWER LEAKING TO ADJACENT CHANNEL

TECHNICAL FIELD

The present invention relates to an adjacent and alternate channels power measurement apparatus which measures leakage power in the adjacent and alternate channels in TDMA (Time Division Multiple Access) communication, wherein transmission is modulated by digital data which is set in a transmission frame containing a synchronizing word.

BACKGROUND ART

Mobile communications systems such as mobile telephones and portable telephones adopt TDAM (Time Division Multiple Access) system, so that they may efficiently use communications lines as communications systems between a base station and radio devices which operate as mobile terminals.

Some specific examples of the mobile communications systems adopting the TDMA system are PDC (Personal Digital Cellular System; Japan), PHS (Personal Handyphone System; Japan), and GSM (Global System for Mobile Communications; Europe).

In these systems, communication signals or burst signals are exchanged between the base station and each radio device (i.e., a mobile station). As FIG. 5 shows, each burst signal has a signal region $T_1$ and a non-signal region $T_2$ in every signal cycle $T_0$.

The burst signal has been modulated with digital data which is set in a transmission frame to be transmitted.

To provide more communications lines between the base station and the radio devices (mobile stations), narrow carrier frequency bands are allocated to the adjacent communications lines.

As described above, the carrier is modulated with the digital data to be transmitted. The modulated signal therefore contains not only a component of frequency $f_c$ but also many other components of frequencies near frequency $f_c$.

As a result, the frequency range for the modulated signal broadens. If the frequency range for the components of the modulated signal broadens, the component of communication signal a to be transmitted on the carrier will acts as leakage power, adversely influencing adjacent communication signal lines on adjacent carriers.

The influence of the leakage power on the adjacent carriers, i.e., the adjacent channels, is regulated by the standards of each system.

ETS300 607 of ETSI for the GSM system is one of such standards.

According to the standards for the GSM system, the influence is regulated in terms of a fall (dB) of each power level at a frequency, which differs, from the carrier frequency $f_c$ by an offset frequency $f_{OFF}$.

Apparatuses designed for use in NADC (North America Digital Cellular) systems to measure leakage power in the communication signal composed of a burst signal are known. One example is an adjacent and alternate channels power measurement apparatus shown in FIG. 6 (Jpn. Pat. Appln. KOKAI Publication No. 6-326672; U.S. Pat. No. 5,475,709).

An input signal $a_1$ composed of a burst signal of the type shown in FIG. 5 is input from an input terminal 1 to the mixer 3 of a signal processing section 2.

The mixer 3 converts the input signal a, to an intermediate-frequency signal (IF signal), by using a local oscillation signal supplied from a local oscillator 4. A band-pass filter 5 removes unnecessary frequency components from the intermediate-frequency signal. Further, a level detector 6 detects the envelope of the signal, and an A/D converter 7 converts the signal to a digital input signal.

A frequency switching section 8 switches the frequency of the local oscillation signal supplied from the local oscillator 4, to a frequency which corresponds to the self channel, i.e., the carrier frequency $f_c$ of the input signal $a_1$. The section 8 then sequentially switches this frequency to frequencies, which correspond to the channels adjacent to the self-channel, i.e., the carrier frequencies of the adjacent channels.

Hence, the signal processing section 2 outputs digital input signals of the frequency components contained in the self channel and adjacent channels, one after another, in synchronism with the switching of the local oscillation frequency performed in the frequency switching section 8.

A data writing section 9 receives the input signals of the self-channel and the adjacent channels which have been sequentially output from the signal processing section 2. The section 9 then writes these signals into the regions of a waveform memory 10 which are assigned to the channels, respectively.

A data reading section 11 detects the rise timing of the envelope waveform stored in that region of the waveform memory 10 which is assigned to the main channel. That is, the section 11 detects the address of the rise timing in the signal region $T_1$ of the burst signal.

Using the timing detected, the reading section 11 reads the digital input signals of the main channel and adjacent channels stored in the regions of the waveform memory 10 and supplies these signals to a power calculating section 12.

The power calculating section 12 calculates power from the signals of each channel, which have been input from the waveform memory 10 and whose band has been limited. The section 12 outputs the powers of the adjacent channels as leakage powers.

With the adjacent and alternate channel power measurement apparatus shown in FIG. 6, however, there are some object that need to be attained.

The objects are concerned with the method of measuring the leakage powers of adjacent channels, which should be performed in the GSM system described above.

The method of measuring the leakage powers of adjacent channels, which should be performed in the GSM system, comprises two steps. First, signals are received at the self-channel and the adjacent channels by using a filter having a bandwidth of 30 kHz. Second, the average power of the specified region of each signal is obtained.

FIG. 7A shows the waveform of the envelope power as viewed along the time axis, which is observed when a communication signal is received from a GSM system in the band width of 30 kHz.

FIG. 7B represents the waveform observed when a GSM signal is received in a bandwidth of 1 MHz.

As seen from FIG. 7B, the rising position and falling position of the burst signal received in the broad band can be detected with high accuracy.

As shown in FIG. 7A, however, it is difficult to detect the rising position and falling position of the burst signal received in the narrow band. This is because the filter response influences the waveform.

In the case shown in FIG. 7A, the signal may have no peaks at the rising position or the falling position, unlike in the case illustrated in FIG. 7B.

In view of this, the average value of the signals should be presented, instead of the peak values thereof, in the method of measuring the leakage powers of adjacent channels. If so, the signals will differ but less from one another, making it easier to evaluate them.

In the GSM system, evaluation is made on the basis of both the peak value and the average value. It is instructed that the average value be calculated for a specific region.

The specific region designated in the GSM system is the region (T3) which extends from the latter half of the burst signal, which excludes the training sequence, i.e., synchronizing word part, of a fixed pattern located close to the center of the burst signal, to the part which is not influenced by a transient response.

More specifically, 40 bits or more, or bits in the range of the 87th bit to 132nd bit, are designated to serve as the specific region.

In the adjacent and alternate channels power measurement apparatus shown in FIG. 6, however, the signal output from the band-pass filter 5 has such a waveform as is illustrated in FIG. 7A.

With the position-determining method which is employed in the conventional apparatus shown in FIG. 6 and which uses the rising position and falling position of a burst signal, it is difficult to find the position of the specific region to meet the demand made by a GSM system. Therefore, an average power for the specific region cannot be calculated.

That is, the conventional apparatus shown in FIG. 6 is designed to accomplish adjacent and alternate channels power measurement in the NADC (North America Digital Cellular) systems.

In the case of NADC, the band measured is almost the same as the band occupied, and it is used in communication. The band itself is not so broad, having a width of 25 kHz. Demodulation can therefore be achieved even after the frequency has been changed and the band has been limited.

Hence, in the NADC-adapted measuring apparatus it is possible to use a band-limiting filter before the signals are stored into the memory.

By contrast, an apparatus designed to achieve adjacent-channel measurement in the GSM (Global System for Mobile Communications; Europe) cannot perform demodulation after the band has been limited. This is inevitably because the GSM measuring-band is narrow, having a width of 30 kHz which is narrower than the band for use in communication (having a width of about 300 kHz).

Disclosure of Invention

Accordingly the object of the present invention is to provide an adjacent and alternate channels power measurement apparatus which can accurately detects the specific region of a burst signal and which can therefore effect measuring of the leakage powers of adjacent channels, including the calculation of the average power value for the specific region.

To be more specific, the present invention has been made in view of the foregoing. In the invention, the digital data set in the transmission frame contained in a burst signal is stored into a waveform memory, thereby demodulating the data. A synchronizing word is detected from the demodulated data and associated with the address of the waveform memory, thereby determining the position of the synchronizing word. The synchronizing word is used, thus specifying the waveform data for a specific region demanded. The waveform data is made to pass through a filter, thereby changing the frequency and limiting the band. The invention therefore makes it possible to measure the leakage powers of adjacent channels in the GSM system, at a more accurate measuring position.

According to the invention there is provided an adjacent and alternate channels power measurement apparatus which is designed to receive a burst signal obtained by modulated a carrier frequency for a main channel with digital data set in a transmission frame and containing a pre-designated specific data item and to measure leakage power appearing in channels adjacent to the main channel, said apparatus comprising:

A/D converting means (23) for converting the burst signal to digital signals;

waveform memory means (25) for storing the digital signals;

demodulating means (29) for demodulating the digital signals read from the waveform memory means to the digital data;

extraction region calculating means (33, 34) for detecting a position of the pre-designated specific data item from the digital signals read from the waveform memory and determining an extraction region of the digital signals stored in the waveform memory means, in accordance with the position of the pre-designated specific data item, thus detected;

filter means (35) for allowing passage of a main-channel signal component contained in the digital signals and adjacent-channel signal components contained in the digital signals;

supply means (27, 28, 34) supplying, to the filter means, that one of the digital signals stored in the waveform memory which exists in the extraction region determined by the extraction region calculating means; and power measuring means (36) for individually measuring power of the main-channel signal component and adjacent-channel signal components which have passed through the filter means.

BRIEF DESCRIPTION OF DRAWINGS

FIG. 4H is a diagram showing an example of data displayed by the display section;

BEST MODE OF CARRYING OUT THE INVENTION

Figure 1A:
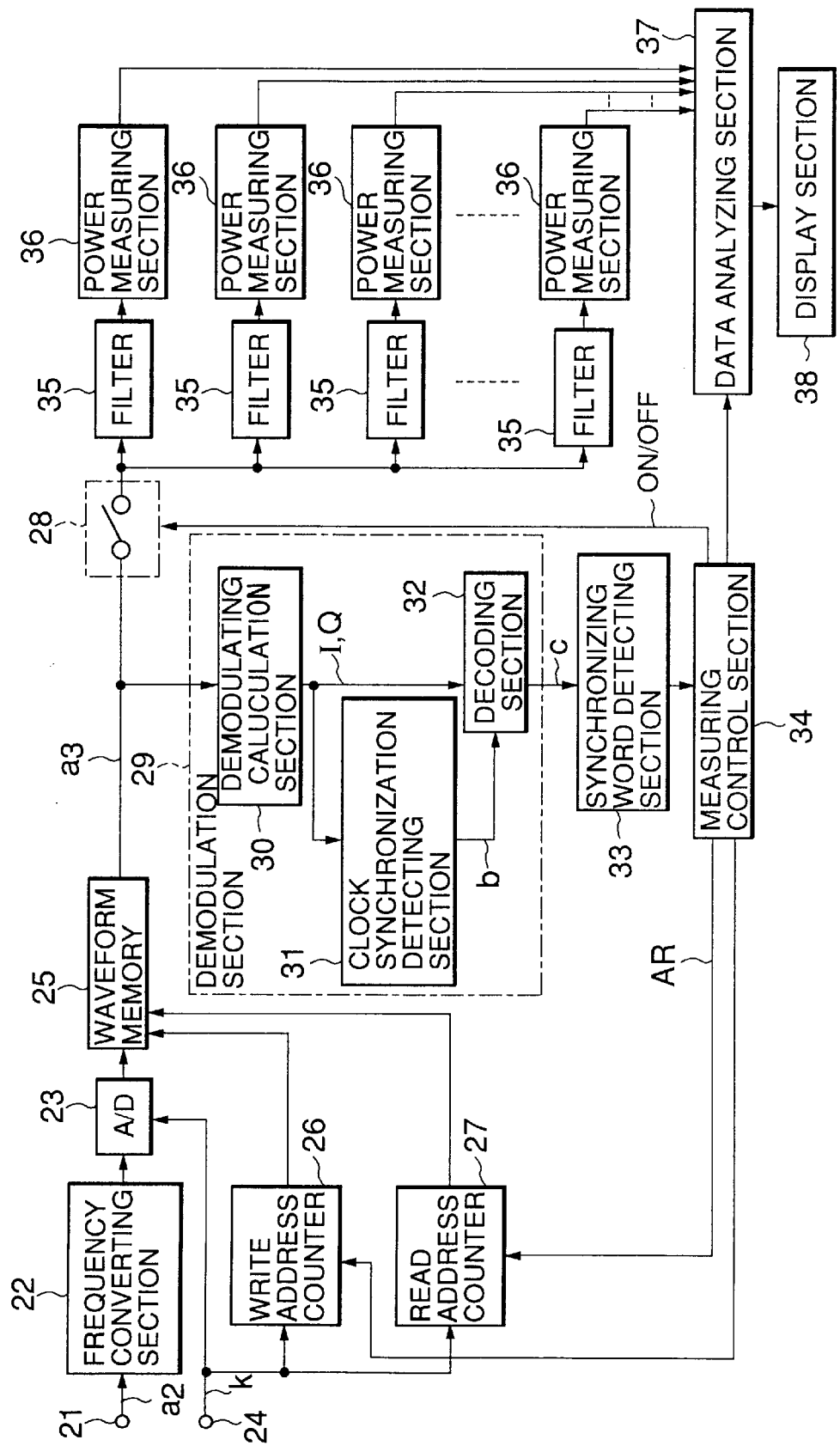
FIG. 1A is a block diagram schematically showing the adjacent and alternate channels power measurement apparatus according to a first embodiment of the invention.

First, the present invention will be summarized.

In order to achieve the above-mentioned object, an adjacent and alternate channels power measurement apparatus comprises: an A/D converter for receiving a burst signal modulated with digital data set in a transmission frame containing a synchronizing word and effecting A/D conversion on the burst signal; a waveform memory for storing the A/D-converted input signal; a demodulating section for demodulating the input signal read from the waveform memory to the original digital data; extraction region calculating means for detecting the position of the synchronizing word of the digital data demodulated by the demodulating section and determining an extraction region of the input signal stored in the waveform memory means, in accordance with the position of the synchronizing word thus detected; a plurality of filters for allowing passage of the signal components contained in the input signal and having the frequency bands for a main channel and channels adjacent to the main channel; switching means for supplying to the filters that one of the input signals stored in the waveform memory which has been determined; and a plurality of power measuring sections for measuring the powers of the signal components which have passed through the filers, respectively.

Another adjacent and alternate channels power measurement apparatus according to the invention comprises: an A/D converter for receiving a burst signal modulated with digital data set in a transmission frame containing a synchronizing word and effecting A/D conversion on the burst signal; a waveform memory for storing the A/D-converted input signal; a demodulating section for demodulating the input signal read from the waveform memory to the original digital data; extraction region calculating means for detecting the position of the synchronizing word of the digital data demodulated by the demodulating section and determining an extraction region of the input signal stored in the waveform memory means, in accordance with the position of the synchronizing word thus detected; a digital filter having a pass frequency varied in accordance with an external instruction; pass-frequency band setting means for setting the pass frequency of the digital filter, sequentially at the frequency of the main channel contained in the input signal and then at the frequencies of the channels adjacent to the main channel; switching means for supplying to the digital filter that one of the input signals stored in the waveform memory which exists in the region set, a plurality of times in synchronism with the frequency-band setting performed by the pass-frequency band setting means; and a power measuring section for sequentially measuring the powers of the signal components which have passed through the digital filter whose pass-frequency band has been set at various frequency bands.

In the adjacent and alternate channels power measurement apparatus thus structured, the input signal composed of a burst signal is subjected to A/D conversion and then written into the waveform memory.

The input signals written in the waveform memory are sequentially read out. The demodulating section demodulates any modulated signal set in the signal region of the burst signal, to the original digital data.

The digital data is set in the signal region, while set in a predetermined transmission frame.

The training sequence, i.e., the position of the synchronizing word, set into the transmission frame from the digital data demodulated is thereby specified.

The extraction region of the input signal stored in the waveform memory is accurately set in units of bits of the digital data, on the basis of the position of the synchronizing word.

In other words, an address region in the waveform memory is determined.

Then, that one of the input signals stored in the waveform memory, which exists in the extraction region, designated is read by the switching means and is input to the filters which have pass-frequency bands corresponding to the channels.

As a result, the signals output from the filters having different pass-frequency bands are supplied to the power measuring section. From these signals the power measuring section measures the powers corresponding to the channels.

The signals which are the frequency components input to the power measuring sections are signals whose time regions have been correctly designated. Therefore, the apparatus of the present invention can measure the leakage power of adjacent and alternate channels, with a higher accuracy than the conventional apparatus.

In the other measuring apparatus according to the invention, a digital filter whose pass-frequency band can be changed is used in place of a plurality of filters which have different pass-frequency bands.

The pass-frequency band of the digital filter is switched, sequentially to the frequency bands corresponding to channels. Every time the pass-frequency band is switched, the signal in the extraction region is read from the waveform memory and input to the digital filter. Thus, one digital filter suffices to provide signals having the frequency components, which correspond to the channels, respectively.

And a single power measuring section measures the powers of the signals sequentially output from the digital filter and having components corresponding to the channels.

Thus, the number of required filters can be reduced to one, thereby simplifying the structure, if the measuring speed need not be so high.

Embodiments of the present invention will now be described, with reference to the accompanying drawings.

First Embodiment

FIG. 1A is a block diagram schematically showing the adjacent and alternate channels power measurement apparatus according to the first embodiment of the invention.

Figure 2:
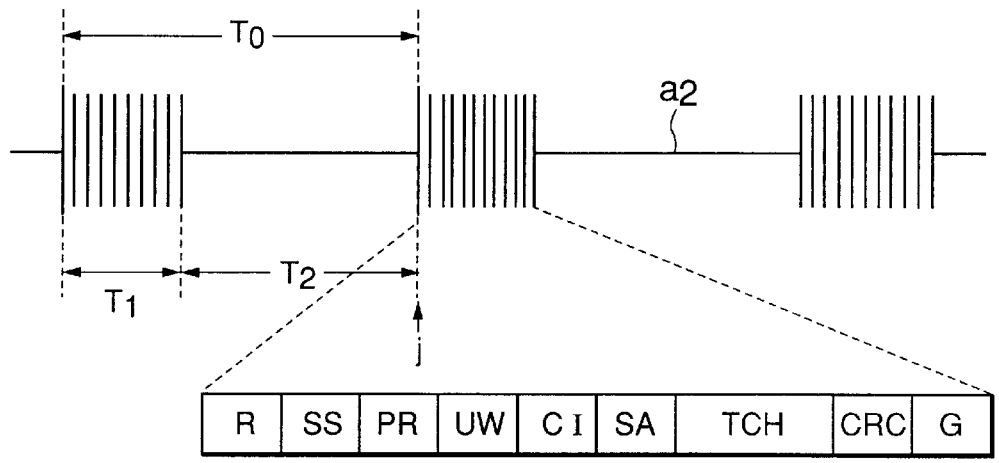
FIG. 2 is a diagram illustrating the waveform of an input signal and the transmission format contained in a signal region.

An input signal $a_2$ composed of a burst signal input to an input terminal 1 and having the waveform shown in FIG. 2 is supplied to a frequency converting section 22.

The input signal $a_2$ has been generated by modulating a carrier having a carrier frequency $f_c$, with the digital data which is to be transmitted.

As shown in a transmission frame formed in a signal region $T_1$, the input signal $a_2$ has ramp time R at the heat. It further has a start symbol SS, a preamble PR, a synchronizing word UW, a channel type C1, SACCH (SA), data channel TC in which the data to be transmitted is set, a cursing symbol CRC, and a guard time, all arranged sequentially after the ramp time R.

The carrier frequency of the input signal $a_2$, for example, 890.2 Mhz, is converted by frequency converting section 22 to a predetermined frequency (e.g., 10 MHz at the maximum).

The input signal $a_2$, thus frequency-converted, is input to an A/D converter 23.

The AID converter 23 samples the input signal $a_2$ with the frequency $f_S$ (e.g., 40 MHz) of the clock signal k input from a clock terminal 24, thereby converting the signal to a digital input signal $a_2$.

The digital input signal $a_2$ is generated by the A/D converter 23 is supplied to a waveform memory 25.

The waveform memory 25 has a storage capacity large enough to store the data sampled for one signal cycle $T_0$ of the input signal shown in FIG. 2.

The sampled data items of the digital input signal $a_2$, input at the addresses designated by a write address counter 26 which is driven by the clock signal k, are sequentially written into the waveform memory 25.

As a read address counter 27 designates the addresses of the waveform memory 25, one by one, in accordance with the clock signal k, the digital input signal $a_2$ for one signal cycle $T_0$, written in the addresses, is sequentially read from the waveform memory 25.

The components 22, 23, 25, 26 and 27 are hardware. By contrast, the components 28, 29, 33, 34, 35, 36 and 37, which will be described later, can be realized by software, by using mainly a CPU (including a DSP) and program-storing memories (ROM, RAM).

The digital input signal $a_3$ for one signal cycle $T_0$, read from the waveform memory 25, is input to a switch section 28 and also to a demodulating section 29.

The demodulating section 29 comprises a demodulation calculation section 30, a clock synchronization detecting section 31, and a decoding section 32.

The demodulation calculation section 30 demodulates the input signal $a_3$ which is composed of the input digital modulated signal, and outputs digital base-band signals I and Q.

The clock synchronization detecting section 31 generates the clock signal b of the original digital data, from the base-band signals I and Q which have been output from the demodulation calculation section 30.

The decoding section 32 samples the base-band signals I and Q output from the demodulating calculation section 30, at the timing based on the clock signal b which has been output from the clock synchronization detecting section 31. The section 32 generates the original digital data from the sampled value and outputs the digital data in the form of demodulated data c.

The demodulated data c contains digital data set in the transmission frame which extends, as shown in FIG. 2, from the ramp time R to the guard time G in the signal region $T_1$.

The demodulated data c output from the demodulating section 29 and composed of the digital data set in the communication frame shown in FIG. 2 is input to a synchronizing word detecting section 33.

The synchronizing word detecting section 33 detects the synchronizing word UW from the digital data set in the communication frame shown in FIG. 2. The section 33 supplies the start position of the synchronizing word UW to a measuring control section 34.

Figure 7A:
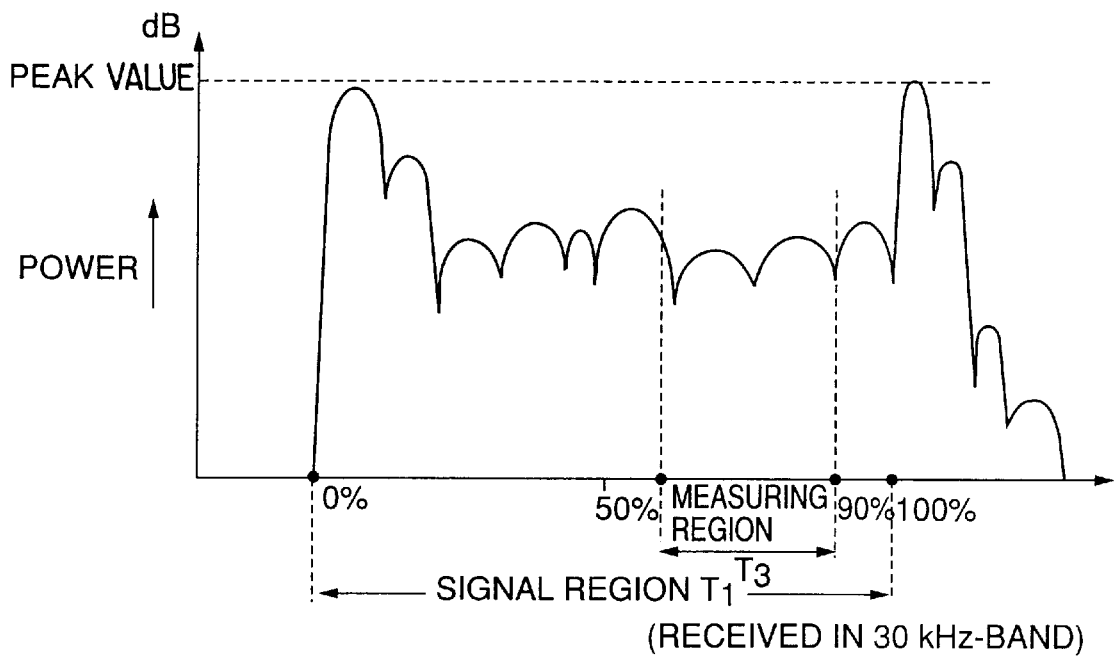
FIGS. 7A and 7B are diagrams illustrating the waveform a burst signal has in a signal region.

The measuring control section 34 calculates an extraction region AR ($AD_S$ to $AD_E$) on the basis of the start position of the synchronizing word UW, which has been input from the synchronizing word detecting section 33. The extraction region AR is that address region in the waveform memory 25 which corresponds to the power measuring region $T_3$ included in the signal region $T_1$ of the burst signal shown in FIG. 7A.

The measuring control section 34 sets the extraction region AR ($AD_S$ to $AD_E$) thus calculated, in the read address counter 27.

Further, the measuring control section 34 performs on/off control on the switch section 28, and supplies a start instruction to a data analyzing section 37.

The input signal $A_3$ in the extraction region AR, which has been sequentially read from the waveform memory 25, is input to filters 35 through the switch section 28 which is on.

Figure 3:
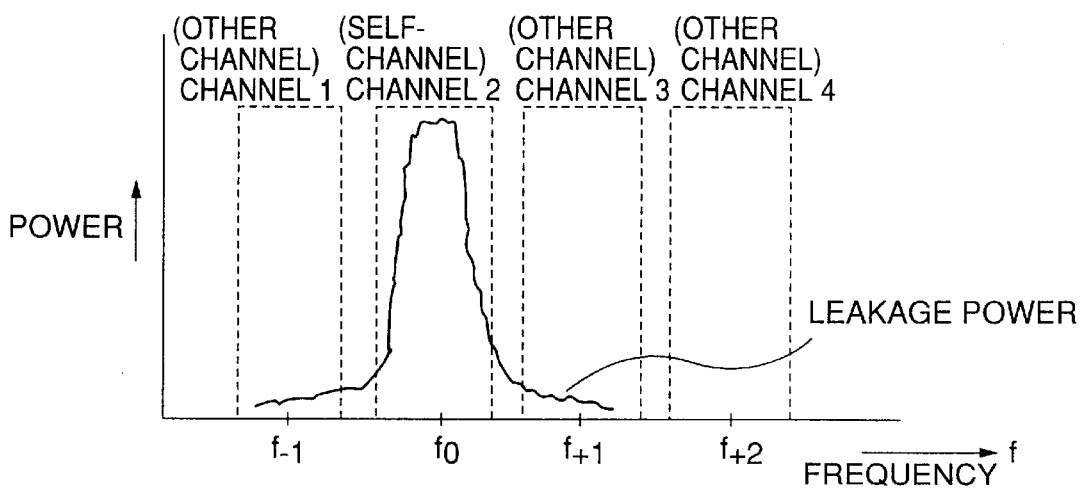
FIG. 3 is a diagram representing the relationship between each channel and leakage power.

The filters 35 are digital filters. The pass-frequency bands of the filters 35 are set at the pass-frequency bands $BW_1$, $BW_2$, $BW_3$, $BW_4$, . . . of channels including the self channel (i.e., channel 2), as is illustrated in FIG. 3.

The center frequencies of the pass-frequency bands are set at $f_{-1}$, $f_0$, $f_{+1}$, $f_{+2}$, In this case, the channel 2 is the self-channel, and the channels 1, 3, 4 are the adjacent channels.

The input signal $a_3$, which as passed through each filter 35, is input to one power measuring section 36.

Each power measuring section 36 calculates the power of the input signal $a_3$, which has passed through the filter 35.

More specifically, the power value is, for example, the root mean square of the signal value.

The power values of the channels 1 to 4, which the power measuring sections 36 have calculated, are supplied to the data analyzing section 37.

The data analyzing section 37 obtains the leakage power from the power values of the channels supplied from the power measuring sections 36, with respect to the adjacent channels of the input signal $a_2$. The results obtained are displayed by the display section 38, in numerical values or in graphics.

With reference to the flow chart of FIG. 1D, it will be explained how the measuring control section 34 operates in the adjacent and alternate channels power measurement apparatus of the structure described above.

Figure 7B:
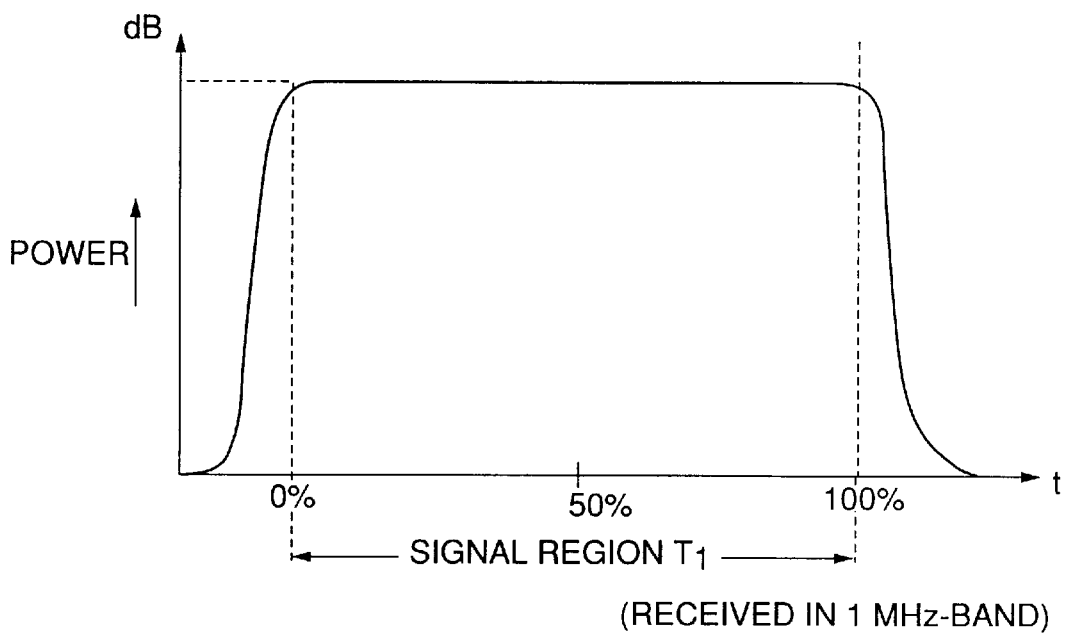

(1) The switch section 28 is turned off.
(2) An activation signal is supplied to the read address counter 26 for a time much longer than one signal cycle $T_0$, thereby writing into the waveform memory 25 the signal for at least one signal cycle $T_0$ of the signal $a_2$ (Step S1).
(3) The read address counter 27 is activated, thereby reading from the waveform memory 25 the received signal $a_3$ for one signal cycle $T_0$ including the signal region and the non-signal region. The signal $a_3$ is supplied to the demodulating section 29, whereby the clock signal is reproduced. The original digital data is demodulated, and the synchronizing word is detected (Steps S2 to S6).
(4) The start position of the synchronizing signal UW is input from the synchronizing word detecting section 33. At this time, the address region of the input signal $a_2$ stored in the waveform memory 25, which corresponds to the power measuring region $T_3$, is calculated as the extraction region AR ($AD_S$ to $AD_E$) (Steps S7 and S8).
(5) The switch section 28 is turned on.
(6) The extraction region AR ($AD_S$ to $AD_E$) thus calculated is read and set in the read address counter 27. The read address counter 27 is activated, thereby reading from the waveform memory 25 the received signal $a_3$ which corresponds to the power measuring region $T_3$ shown in FIG. 7. The received signal $a_3$ is supplied to the filers 35 (Step S9).
(7) The data analyzing section 37 is activated, and the results of measuring and analysis are displayed (Steps S10 and S11).

In the adjacent and alternate channels power measurement apparatus thus structured, the input signal $a_2$ composed of a burst signal is subjected to A/D conversion, written into the waveform memory 25, and held therein for some time.

The input signal $a_2$ written in the waveform memory 25 is sequentially read out. The modulated signal set in the signal region $T_1$ is demodulated into the original digital data in the demodulating section 29.

The position of the synchronizing word UW set in the transmission frame is determined from the demodulated digital data in the synchronizing word detecting section 33.

The extraction region AR ($AD_S$ to $AD_E$) of the input signal $a_2$ stored in the waveform memory 25 is correctly set in units of bits, on the basis of the position of the synchronizing word UW.

Of the input signal $a_2$ stored in the waveform memory 25, the signal for the extraction region AR ($AD_S$ to $AD_E$) designated is read out and input to the filters 35 having pass-frequency bands BW1 to BW4 which correspond to the channels, respectively.

As a result of this, the power measuring sections 36 measure the powers corresponding to the channels from the input signals $a_3$ output from the filters 35 which have different pass-frequency bands.

Hence, the leakage power at a correct measuring position is calculated with the respect to the adjacent channels.

Figure 6:
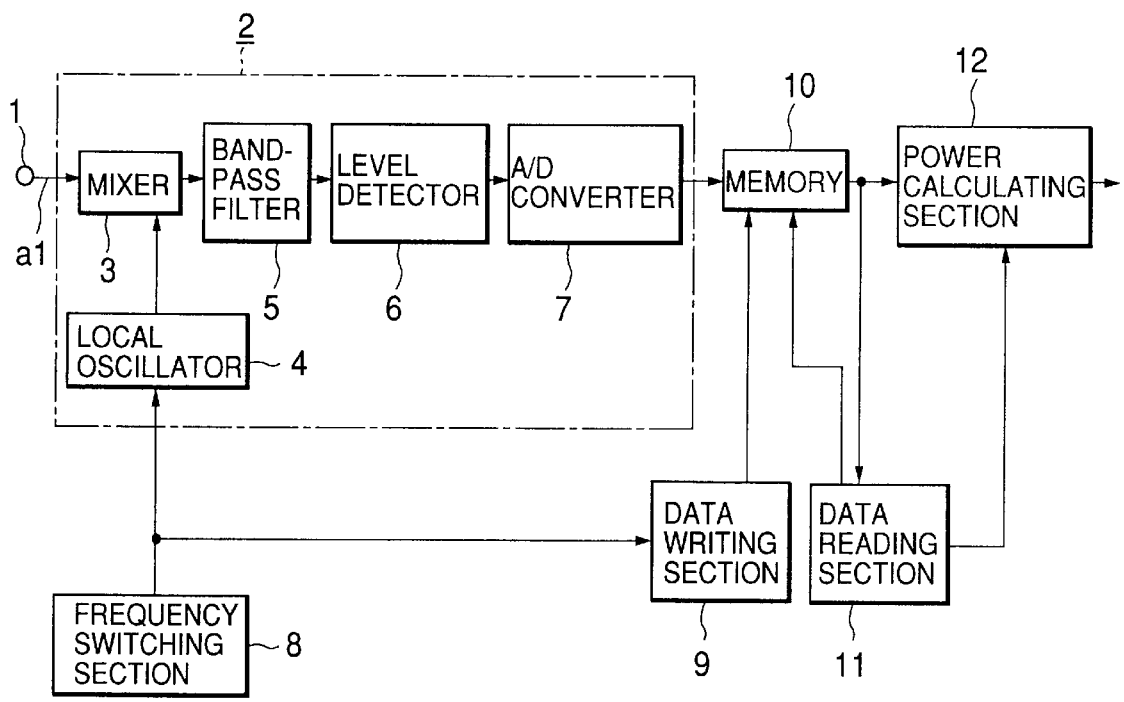
FIG. 6 is a block diagram schematically showing the conventional adjacent and alternate channels power measurement apparatus.

As mentioned above, the signal of a frequency component, output from each filter 35 and input to the power measuring section 36 associated with the filter 35, is a signal correctly assigned to the power measuring region $T_3$ of the signal region $T_1$ Therefore, the measuring apparatus according to the first embodiment can measure the leakage power with respect to the adjacent channels, much more accurately than the conventional apparatus illustrated in FIG. 6.

Figure 1B:
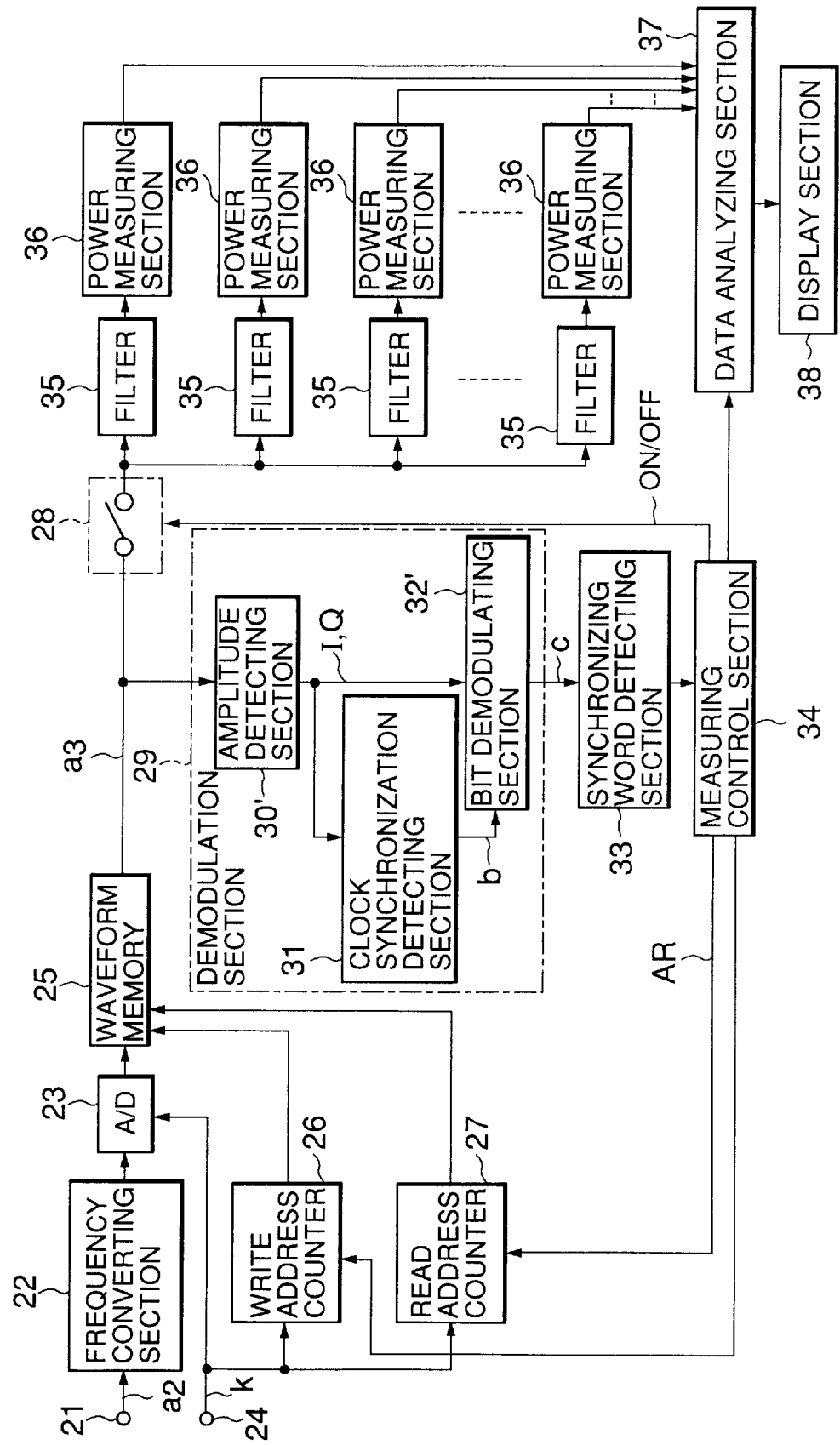
FIG. 1B is a block diagram schematically showing a modification of the adjacent and alternate channels power measurement apparatus according to the first embodiment of the invention.

FIG. 1B shows a modification of the first embodiment. The modification differs only in that a modified demodulating section 29 is used in place of the modification section shown in FIG. 1A.

As shown in FIG. 1B, the demodulating section 29 comprises an amplitude detecting section 30', a clock synchronization detecting section 31, and a bit demodulating section 32'.

The amplitude detecting section 30' detects the part T1 in which a signal exists, from the input modulated digital signal $a_3$ for one signal cycle T0.

The clock synchronization detecting section 31 uses the data of the signal part detected by the amplitude detecting section 30', thereby reproducing the clock signal b of the original digital data. The section 31 supplies the clock signal b to the bit demodulating section 32'.

The bit demodulating section 32' performs sampling on the signal part detected by the amplitude detecting section 30', at the timing based on the clock signal b output from the clock synchronization section 31. The section 32' reproduces the original digital data from the sampled values and outputs the same as modulated data c.

Figure 1C:
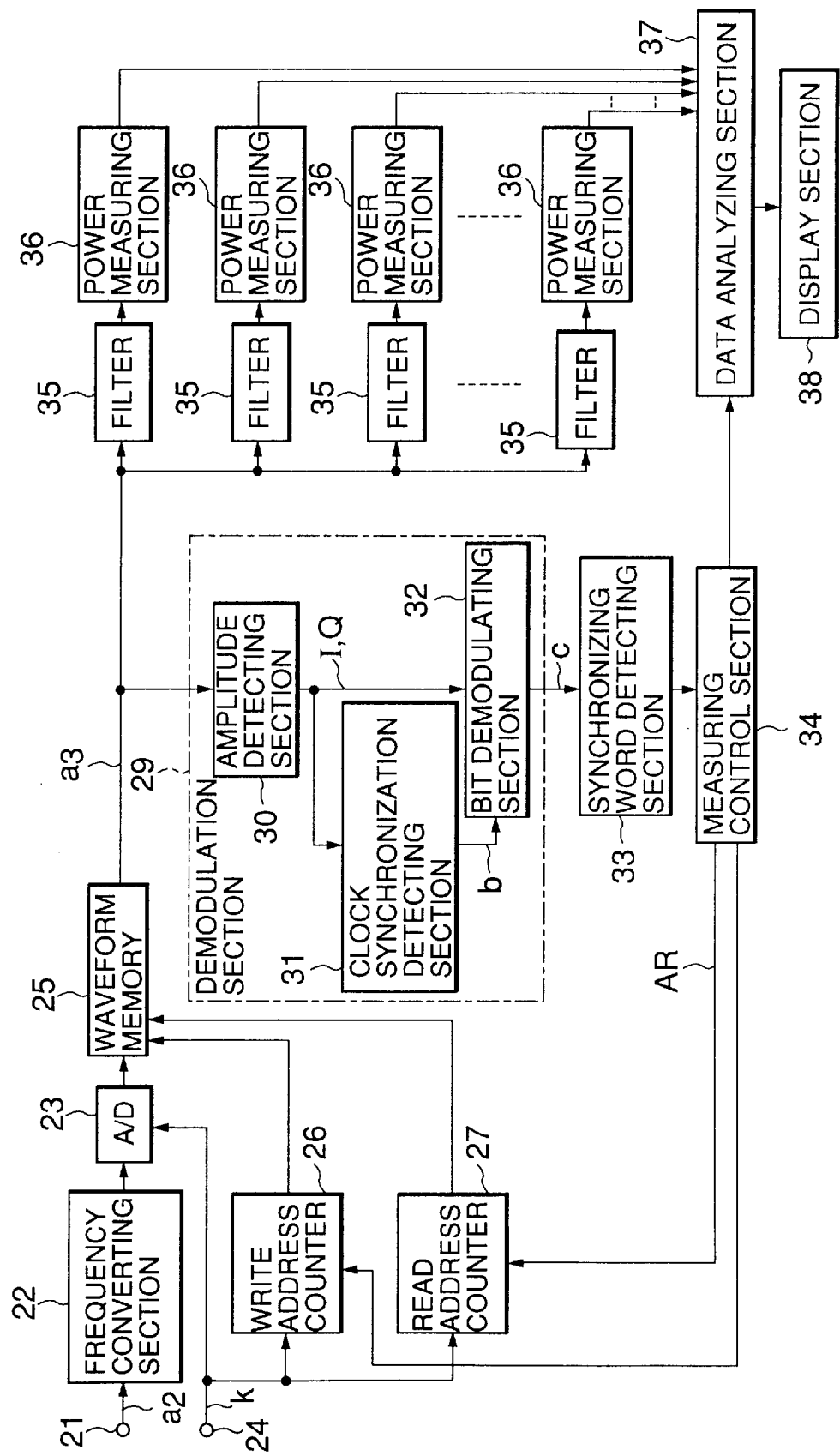
FIG. 1C is a block diagram schematically showing another modification of the adjacent and alternate channels power measurement apparatus according to the first embodiment of the invention.
Figure 1D:
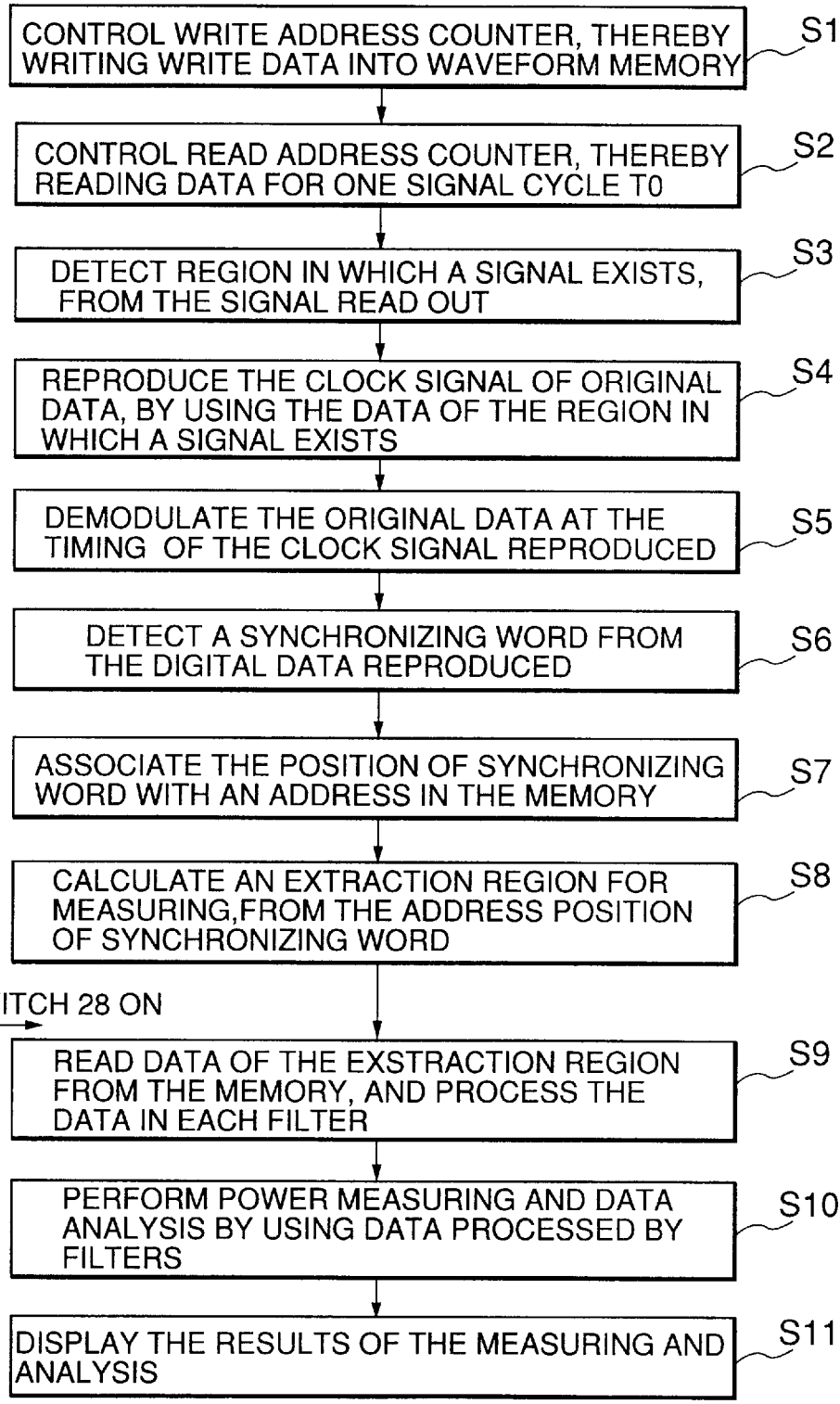
FIG. 1D is a flow chart for explaining the operation of the first embodiment.

As for the overall operation of the modification, the foregoing explanation made with reference to FIG. 1D can be applied without changes.

FIG. 1C shows another modification of the first embodiment. This modification differs in that no component equivalent to the switch 28 is used.

More precisely, this modification is designed such that the measuring control section 34 and the read address counter 27 cooperate to read digital data from the waveform memory 25 for only the above-mentioned extraction region. Therefore, it is unnecessary to switch the output of the memory by means of a switch.

The explanation made with reference to FIG. 1D can therefore holds true of the overall operation of this modification, except for the on/off control of the switch 28.

Second Embodiment

Figure 4A:
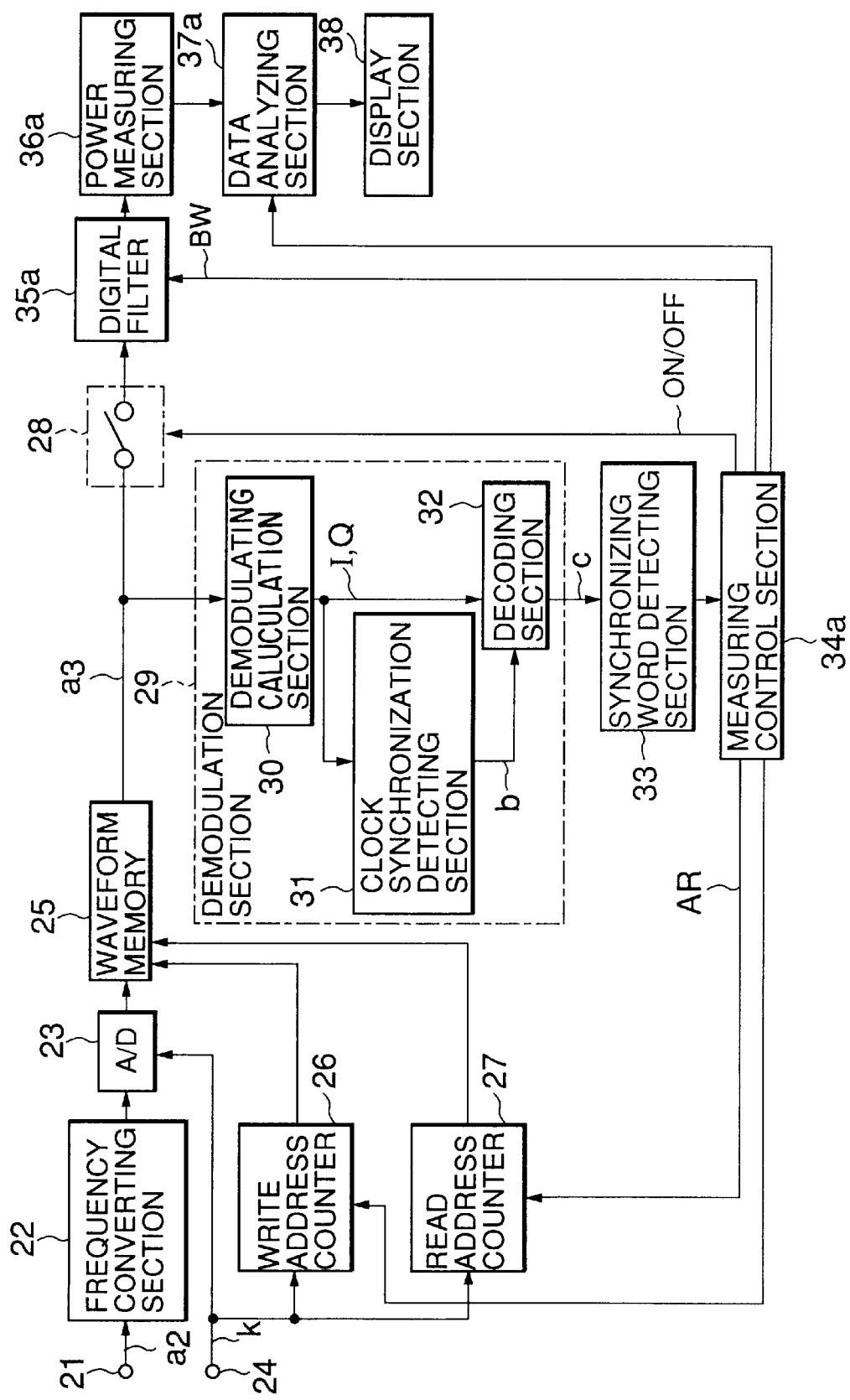
FIG. 4A is a block diagram schematically showing the adjacent and alternate channels power measurement apparatus according to a second embodiment of the invention.

FIG. 4A is a block diagram schematically showing the adjacent and alternate channels power measurement apparatus according to the second embodiment of the invention.

The components identical to those of the first embodiment, i.e., the adjacent and alternate channels power measurement apparatus shown in FIG. 1A, are designated at the same reference numerals in FIG. 4A, and will not be described in detail.

The measuring apparatus according to the second embodiment incorporates one digital filter 35a and one power measuring section 36a, not a plurality of filters 35 and a plurality of power measuring sections 36 as in the first embodiment.

The pass-frequency band BW of the digital filter 35a can be changed in accordance with an instruction supplied from the measuring control section 34a.

To be more specific, the measuring control section 34a sequentially sets pass-frequency bands BW1, $BW_2$, $BW_3$, $BW_4$, ... in the digital filter 35a, for a plurality of channels, including the self channel, which are shown in FIG. 3.

The power measuring section 36a measures the power values for the input signal $a_3$, which have been sequentially output from the digital filter 35a as the pass-frequency bands $BW_1$, $BW_2$, $BW_3$, $BW_4$, are set in the filter 35a. The power values thus measured are supplied to the data analyzing section 37a.

The data analyzing section 37a obtains the leakage power from the power values of the channels supplied from the power measuring sections 36a, with respect to the adjacent channels of the input signal $a_2$. The results obtained are displayed by the display section 38, in numerical values or in graphics.

With reference to the flow chart of FIGS. 4C and 4D, it will be explained how the measuring control section 34a operates in the adjacent and alternate channels power measurement apparatus according to the second embodiment, which has the structure described above.

(1) Steps are sequentially performed, the first of which is to turn off the witch section 28 and the last of which is calculate the extraction region AR ($AD_S$ to $AD_E$). These steps (Steps S1 to S8) are not explained here, because they are identical to the steps of operation the measuring control section 34 performs in the first embodiment.

(5) The extraction region AR ($AD_S$ to $AD_E$) thus calculated is set in the read address counter 27.

(6) The pass-frequency band BW1 for the channel 1 is set in the digital filter 35a (Step S12).

(7) The switch section 28 is turned on, and the read address counter 27 is activated. The input signal $a_3$ in the extraction region AR ($AD_S$ to $AD_E$) is input to the digital filter 35a (Step S13).

There after, the switch section 28 is turned off.

(8) The data obtained by filtering the channel 1 is used, thus measuring power. Then, the pass-frequency band BW2 is set for the channel 2 in the digital filter 35a (Steps S14 to S19).

(9) The switch section 28 is turned on, and the read address counter 27 is activated, thereby inputting the input signal $a_3$ in the extraction region AR ($AD_S$ to $AD_E$) to the digital filter 35a (Step S20).

The switch section 28 is then turned off.

Thereafter, the pass-frequency bands BWs for the other channels are set into the digital filter 35a, one after another, while the input signals $A_3$ in the same extraction region AR ($AD_S$ to $AD_E$) are input to the digital filter 35a are read from the waveform memory 25a and input into the digital filter 35a, one after another. Power is measured by using the data obtained after the filter process performed on the channels 2 to 5 (N=5).

Hence, one digital filter 35a and one power measuring section 36a can measure the leakage power in respect of each adjacent channel.

In the measuring apparatus according to the second embodiment, the input signal a2 stored in the waveform memory 25 is used a number of times. The apparatus is therefore much simpler in structure, though it cannot measure the leakage power so fast as the measuring apparatus according to the first embodiment. The apparatus according to the second embodiment can, therefore, be made small and light at a low manufacturing cost.

Figure 4B:
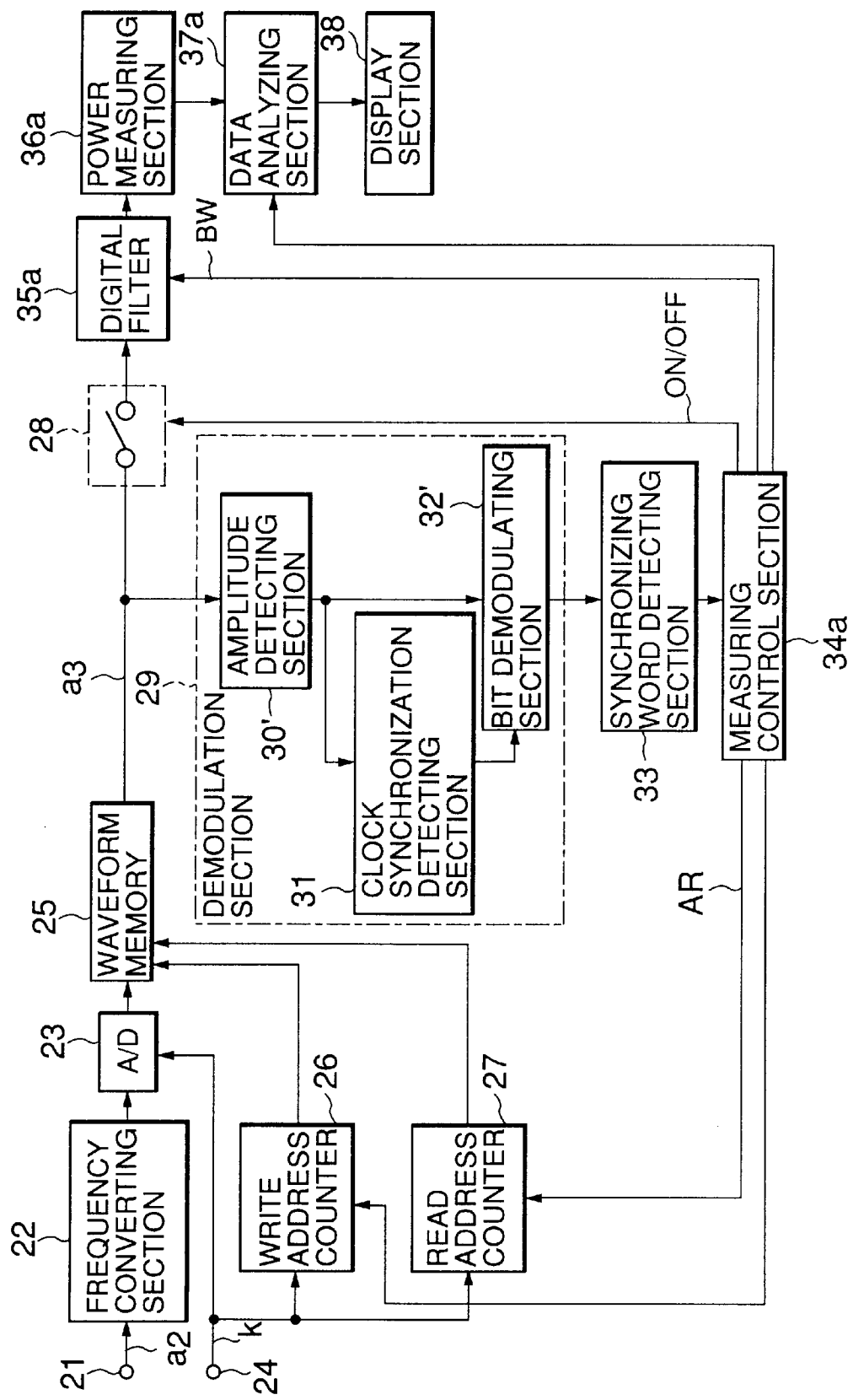
FIG. 4B is a block diagram schematically showing a modification of the adjacent and alternate channels power measurement apparatus according to the first embodiment of the invention.
Figure 4C:
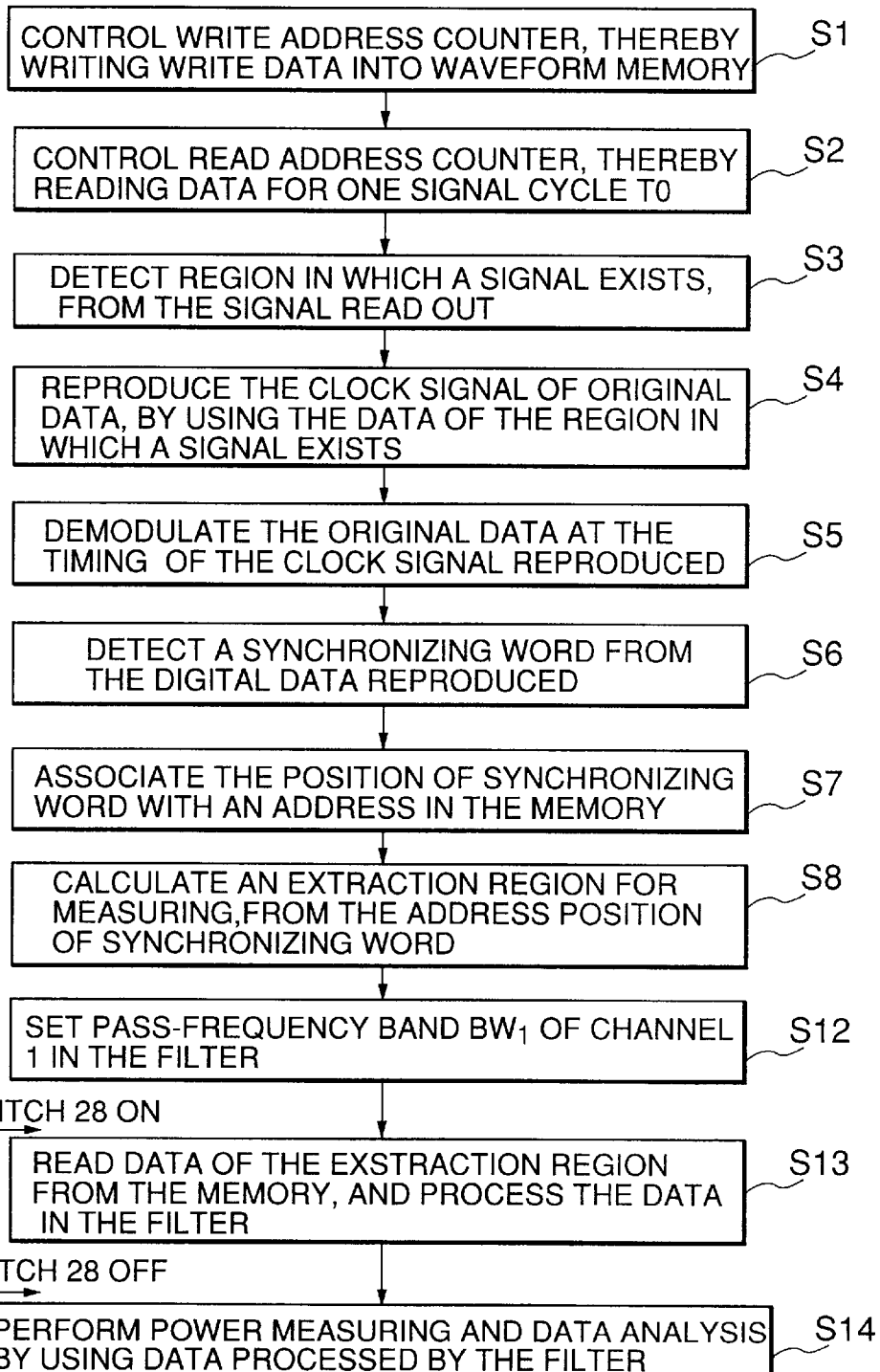
FIGS. 4C and 4D are flow charts for explaining the operation of the second embodiment.
Figure 4D:
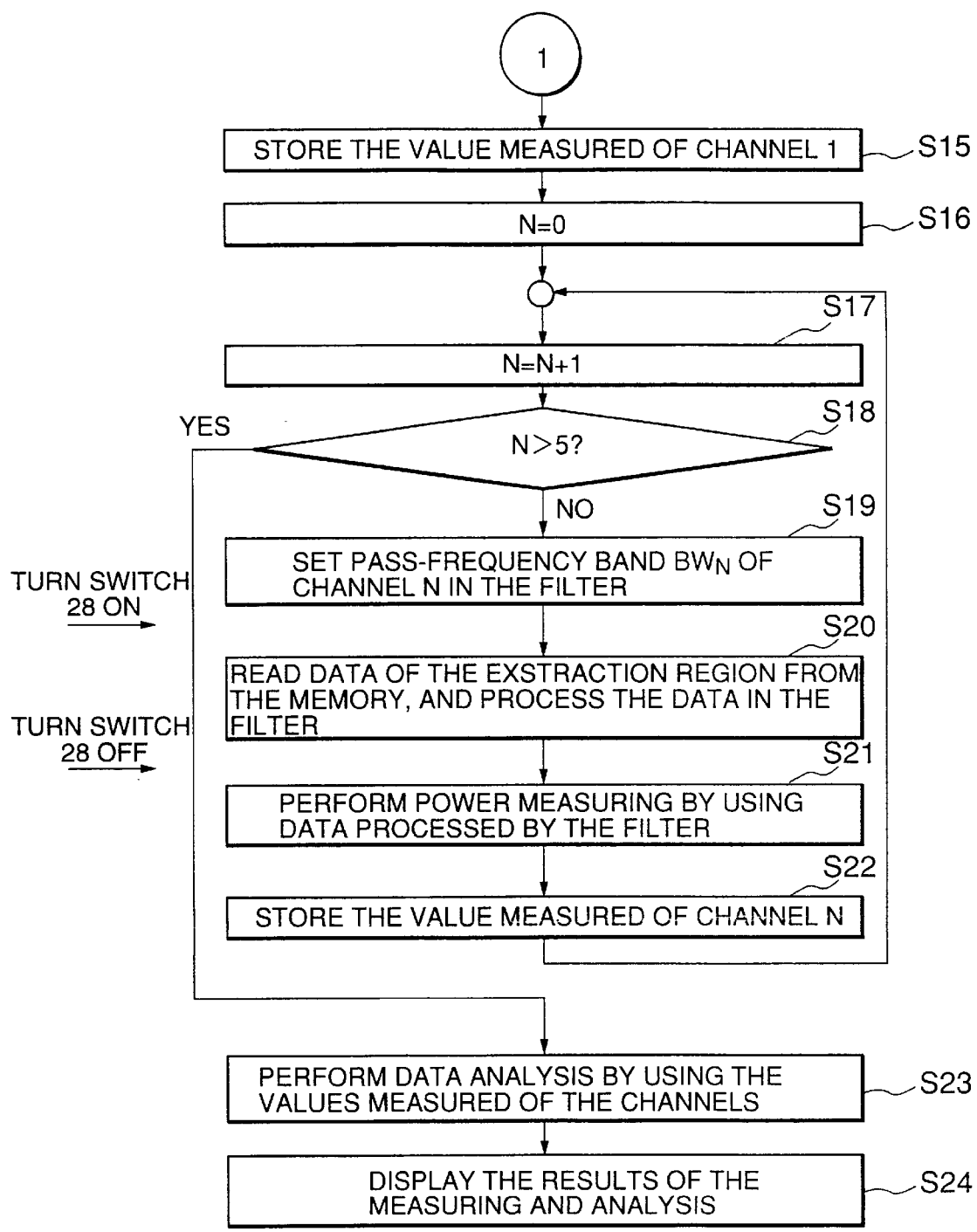

FIG. 4B illustrates a modification of the second embodiment. The modification differs only in that the demodulating section 29 is modified in structure in the same way as shown in FIG. 1B. Thus, the modification will not described.

Figure 4E:
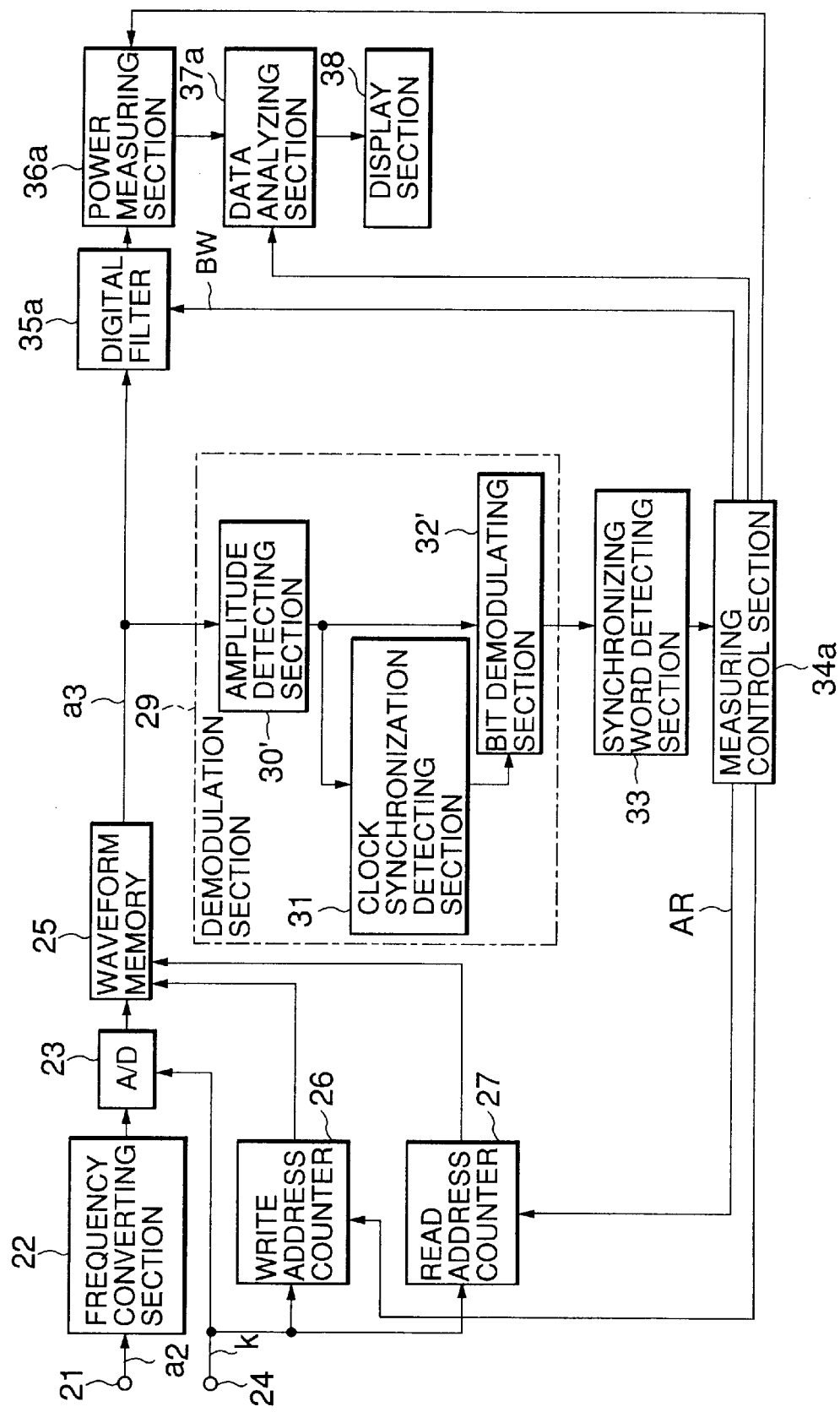
FIG. 4E is a block diagram schematically showing another modification of the adjacent and alternate channels power measurement apparatus according to the first embodiment of the invention.

FIG. 4E shows another modification of the second embodiment. This modification differs from the second embodiment shown in FIG. 4A, in that no switch 28 is used and that the measuring control section 34 controls the power measuring section 36a.

That section (the component 27 et seq.) of this modification, which is realized by software thanks to the use of a CPU or a DSP, will be explained, with reference to the flow chart of FIGS. 4F and 4G.

Figure 4F:
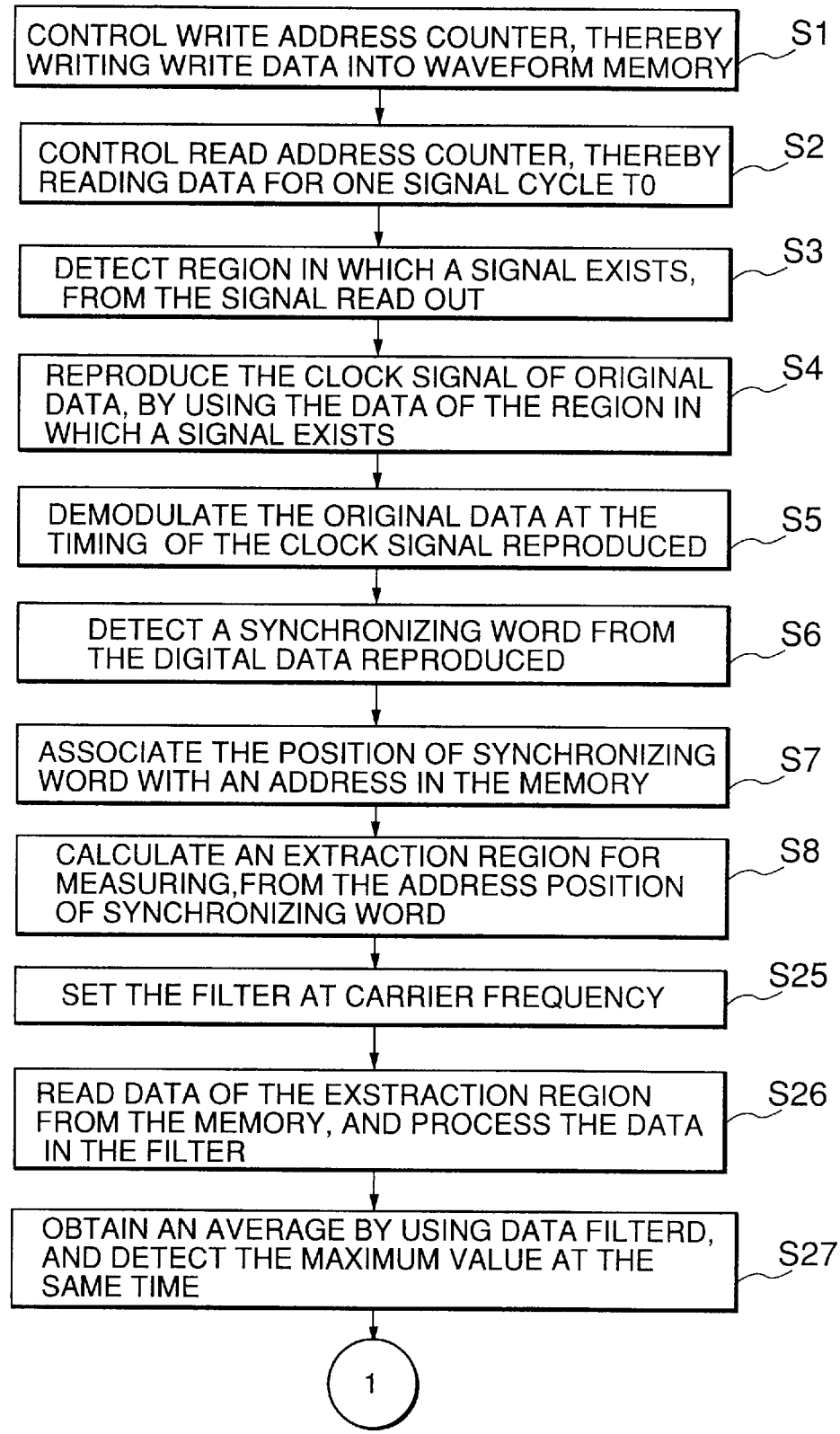
FIGS. 4F and 4G are flow charts for explaining the operation of a still other modification of the second embodiment.
Figure 4G:
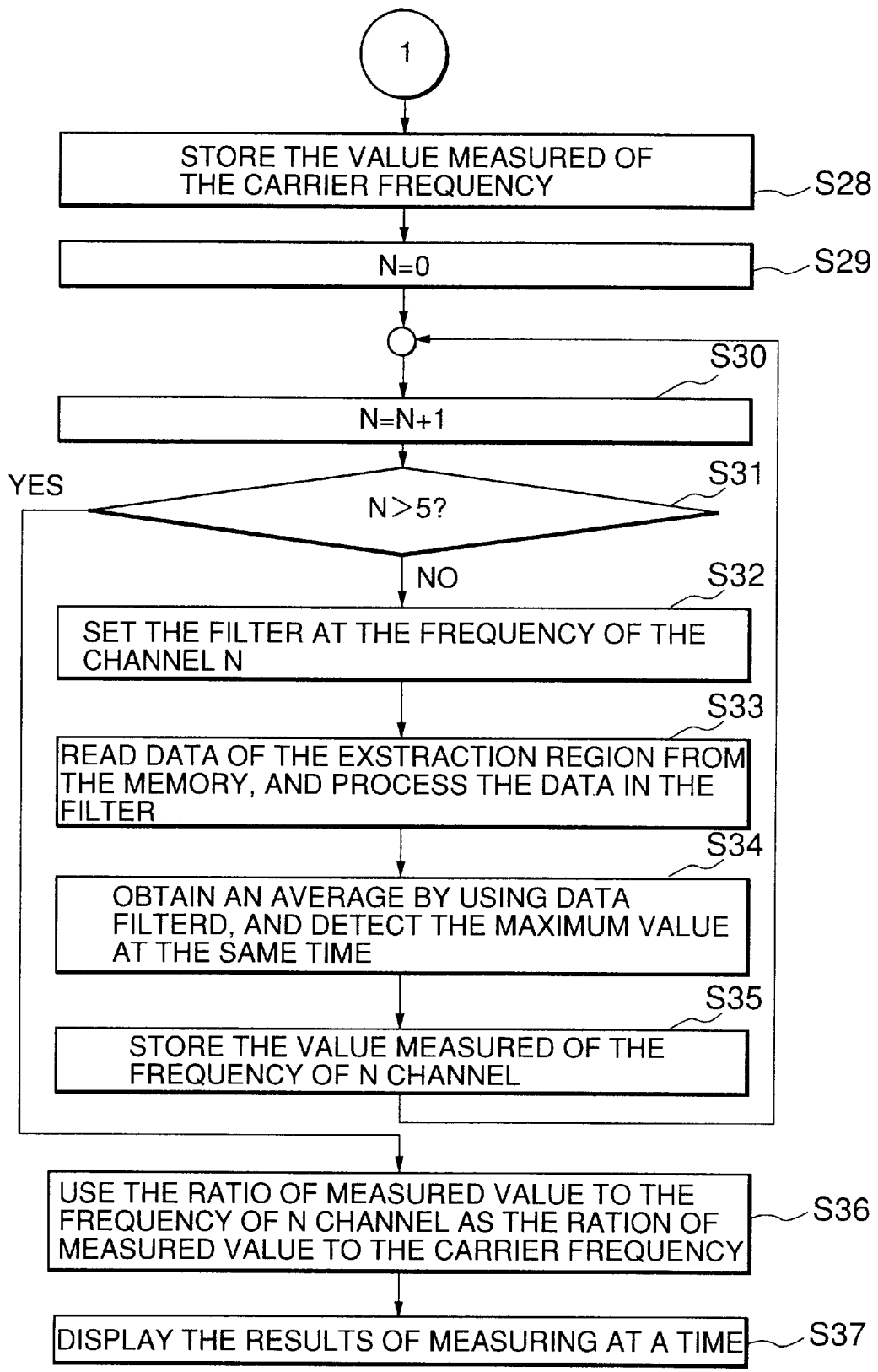

The flow chart shown in FIGS. 4F and 4G depicts how the apparatus measures leakage power with respect to five adjacent channels.

(1) In the control of the write address counter 26 by means of the measuring control section 34a, the write address counter 26 is controlled to store data into the waveform memory 25 (Step S1).

(2) In the control of read address counter 27 by means of the measuring control section 34a, the read address section 27 is controlled to read data for one signal cycle T0 (Step s2).

(3) In the operation of the amplitude detecting section 30, the region in which the signal exists is detected from the signal read (Step S3).

(4) In the operation of the clock synchronization detecting section 31, the clock signal of the original digital data is reproduced by using the data of the region in which the signal exists (Step S4).

(5) In the operation of the bit demodulating section 32, the original digital data is demodulated at the timing of the clock signal reproduced (Step S5).

(6) In the operation of the synchronizing word detecting section 33, a synchronizing word is detected from the digital data reproduced (Step S6).

(7) In the operation of the synchronizing word detecting section 33, the position of the synchronizing word detected is associated with an address in the waveform memory 25 (Step S7).

(8) In the operation of the measuring control section 34a, an extraction region for power measuring is calculated from the address position of the synchronizing word (Step S8).

(9) In the control of the digital filter 34a by means of the measuring control section 34a, the digital filter 35a is controlled so as to set the filter to a carrier frequency (Step S25).

(10) In the control of the read address counter 27 by means of the measuring control section 43a, and also in the operation of the digital filter 35a, the data of the extraction region is read from the memory and processed by the filter (Step S26).

(11) In the operation of the power measuring section 36a, an average is obtained by using the data subjected to filtering, and the maximum value is detected at the same time (Step S27).

(12) In the control of the data analyzing section 37a by means of the measuring control section 34a, the value measured of the carrier frequency is stored (Step S28).

(13) In the operation of the measuring control section 34a, N is set at 0, i.e., N=0 (Step S29).

(14) In the operation of the measuring control section 34a, N is set at N+1, i.e., N=N+1 (Step S30).

(15) In the operation of the measuring control section 34a, it is determined whether N>5 (Step S31).

(16) In the control of the digital filter 35a by means of the measuring control section 34a, the filter is set at the frequency for the N channel (Step S32).

(17) In the control of the read address counter 27 by means of the measuring control section 34a, and also in the operation of the digital filter 35a, the data of the extraction region is read from the waveform memory and processed by the filter (Step S33).

(18) In the operation of the power measuring section 36a, an average is obtained by using the data subjected to filtering, and the maximum value is detected at the same time (Step S34).

(19) In the control of the data analyzing section 37a by means of the measuring control section 34a, the value measured of the frequency of the N channel is stored (Step S35).

(20) In the operation of the data analyzing section 37a, the measured value to the frequency of the N channel is used as the ratio of the measured value to the carrier frequency (Step S36).

(21) In the operation of the display section 38, the average of the values measured of the channels and the largest value are displayed at a time.

Figure 4I:
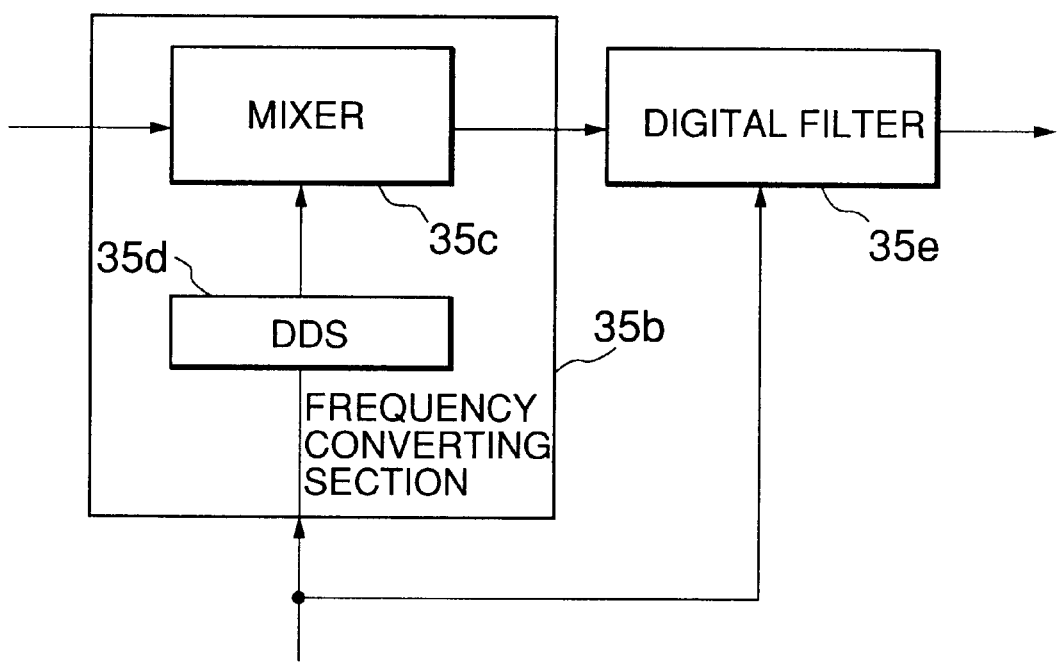
FIG. 4I is a block diagram illustrating specific examples of a filter and a digital filter, for use in the present invention.
Figure 5:
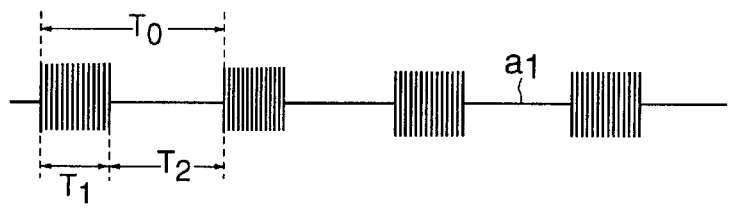
FIG. 5 is a diagram depicting the waveform of an ordinary burst signal.

FIG. 4H is a diagram showing an example of data displayed by the display section 38 (the data can be printed by a printer) after the steps shown in the flow chart of FIGS. 4F and 4G have been carried out. In FIG. 4I, the average of the values measured for each channel is presented in the column of "Modulation", and the largest value is presented in the column of "Switching Transition."

In this case, the data analyzing section 37 normalizes the power value at each offset frequency, by finding the ratio of the value to the value at the frequency offset 0 (corresponding to the carrier frequency).

As has been described above, only one signal cycle suffices to fetch data in the modification of the second embodiment. The modification can therefore perform filtering and power calculation at high speed if a DSP or the like is used.

The modification needs only 1.5 seconds to measure powers of 25 channels (12 channels for the positive frequency offset, and 12 channels for the negative frequency offset) as shown in FIG. 4H, whereas it takes 0.5 second to measure the power for one channel when a spectrum analyzer is employed.

With the present invention it is possible to effect measuring not only at correct positions, but also at high speed. In addition, it is possible to analyze even a single signal, because it suffices to use the signal for one signal cycle only.

The present invention is not limited to the embodiments and the modifications thereof, all described above. Rather, various changes and modifications can be made, without departing from the spirit of the present invention.

For example, band-pass filters may replace the filters 35 and the filter 35a. Alternatively, they may be replaced by a frequency converting section 35b composed of a mixer 35c and a DDS 35d, and a digital filter 35e which is a low-pass filter, as is illustrated in FIG. 4I.

In this case, the DDS 35d, or a direct digital synthesizer, is a digital oscillator. In practice, this component is provided in the form of software.

As has been explained, the modulated signal in the signal region of a burst signal is demodulated and an extraction region of the signal is set on the basis of the signal demodulated, in the adjacent and alternate channel power measurement apparatus according to the present invention.

Hence, the present invention can provide an adjacent and alternate channels power measurement apparatus which can measure the power of each channel by using a signal at a specific position in an input signal and which can therefore measure the leakage powers of adjacent channels with a greatly increased accuracy.

I claim:

1. An adjacent and alternate channels power measurement apparatus which is designed to receive a burst signal obtained by modulated a carrier frequency for a main channel with digital data set in a transmission frame and containing a pre-designated specific data item and to measure leakage power appearing in channels adjacent to the main channel, said apparatus comprising:

A/D converting means (23) for converting said burst signal to digital signals;

waveform memory means (25) for storing the digital signals;

demodulating means (29) for demodulating the digital signals read from said waveform memory means to said digital data;

extraction region calculating means (33, 34) for detecting a position of pre-designated specific data item from the digital signals read from said waveform memory and determining an extraction region of the digital signals stored in said waveform memory means, in accordance with the position of the pre-designated specific data item, thus detected;

filter means (35) for allowing passage of a main-channel signal component contained in the digital signals and adjacent-channel signal components contained in the digital signals;

supply means (27, 28, 34) supplying, to said filter means, that one of the digital signals stored in said waveform memory which exists in the extraction region determined by said extraction region calculating means; and power measuring means (36) for individually measuring power of the main-channel signal component and adjacent-channel signal components, which have passed through said filter, means.

2. An adjacent and alternate channels power measurement apparatus according to claim 1, wherein said filter means comprises a plurality of filters which have different filter characteristics corresponding to the pass-frequency bands of the channels, respectively, said channels including said main channel and said adjacent channels.

3. An adjacent and alternate channels power measurement apparatus according to claim 1, wherein said filter means comprises a single digital filter having filter characteristic which is varied in timedivision fashion to various filter characteristics which correspond to the pass-frequency bands of the channels, respectively, said channels including said main channel and said adjacent channels.

4. An adjacent and alternate channels power measurement apparatus according to claim 1, wherein said filter means comprises a plurality of band-pass filters which allow passage of said signal components, respectively.

5. An adjacent and alternate channels power measurement apparatus according to claim 1, wherein said filter means includes a frequency converting section for converting said signal components to prescribed frequency signals, and a digital filter for allowing passage of the prescribed frequency signals supplied from the frequency converting section.

6. An adjacent and alternate channels power measurement apparatus according to claim 5, wherein said frequency converting section includes a direct digital synthesizer for generating prescribed frequency signals, and a mixer for mixing said the prescribed frequency signals supplied from the direct digital synthesizer and said signal components.

7. An adjacent and alternate channels power measurement apparatus according to claim 1, wherein said supply means includes switching means for selecting and reading, from said waveform memory means, a digital signal which exists in the extraction region determined.

8. An adjacent and alternate channels power measurement apparatus according to claim 1, wherein said supply means includes means for reading, from said waveform memory means, the digital signal in the extracted region for only the extraction region determined.

9. An adjacent and alternate channels power measurement apparatus according to claim 1, wherein said demodulating means includes a modulation/operation section for generating a digital base-band signal from said digital signal, a clock synchronization detecting section for reproducing a clock signal of original digital data from the digital base-band signal, and a demodulating section for reproducing the original digital data from values obtained by sampling the digital base-band signal at timing based on the clock signal.

10. An adjacent and alternate channels power measurement apparatus according to claim 1, wherein said demodulating means includes an amplitude detecting section for detecting from said digital signal a part in which a signal exists, a clock synchronization detecting section for reproducing a clock signal of original digital data by using the signal part detected by said amplitude detecting section, and a bit demodulating section for reproducing the original digital data from values obtained by sampling the signal part at timing based on the clock signal.

11. An adjacent and alternate channels power measurement apparatus according to claim 1, wherein said power measuring means includes means for normalizing the values measured of said adjacent channels, with the value which has been measured of said main channel.

12. An adjacent and alternate channels power measurement apparatus according to claim 11, wherein said power measuring means includes means for obtaining an average by using the data processed by said filter means and detecting a maximum value.

13. An adjacent and alternate channels power measurement apparatus according to claim 12, wherein said power measuring means includes means for normalizing the average value for the channels and the maximum value and outputting the average value and the maximum value at the same time.

* * * * *